US010454780B2

(12) United States Patent
Jeuk et al.

(10) Patent No.: US 10,454,780 B2
(45) Date of Patent: Oct. 22, 2019

(54) OPTIMIZING SOURCE ROUTING USING MACHINE LEARNING

(71) Applicant: Cisco Technology, Inc., San Jose, CA (US)

(72) Inventors: Sebastian Jeuk, San Jose, CA (US); Gonzalo Salgueiro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/834,881

(22) Filed: Dec. 7, 2017

(65) Prior Publication Data

US 2019/0182124 A1    Jun. 13, 2019

(51) Int. Cl.
| | | |
|---|---|---|
| *H04L 12/24* | (2006.01) | |
| *H04L 12/721* | (2013.01) | |
| *H04L 12/851* | (2013.01) | |
| *H04L 12/26* | (2006.01) | |

(Continued)

(52) U.S. Cl.
CPC .............. *H04L 41/16* (2013.01); *G06N 20/00* (2019.01); *H04L 41/12* (2013.01); *H04L 41/147* (2013.01); *H04L 43/08* (2013.01); *H04L 45/02* (2013.01); *H04L 45/124* (2013.01); *H04L 47/2441* (2013.01)

(58) Field of Classification Search
CPC ....... H04L 41/12; H04L 41/147; H04L 41/16; H04L 43/08; H04L 45/02; H04L 45/124; H04L 47/2441; G06N 20/00
See application file for complete search history.

(56) References Cited

U.S. PATENT DOCUMENTS 9,525,617 B2    12/2016 Vasseur et al.
2015/0195192 A1*    7/2015 Vasseur ............... G06F 11/2007
                                                                714/47.3

(Continued)

FOREIGN PATENT DOCUMENTS

CN         106953801 A        7/2017
WO    2007/113521 A1        10/2007

OTHER PUBLICATIONS

A. Valadarsky, et al., "A Machine Learning Approach to Routing", arXiv:1708.03074v1 [cs.NI], Aug. 10, 2017, 7 pages.

*Primary Examiner* — Asad M Nawaz
*Assistant Examiner* — Thomas R Cairns
(74) *Attorney, Agent, or Firm* — Edell, Shapiro & Finnan, LLC

(57) ABSTRACT

A controller device sends predictions from a machine learning module to source endpoints. The controller receives flow information and network information from a network elements in a network. The flow information is associated with source routed data flows that traverse the network in source routed network paths. The network information is associated with network characteristics of each of the network elements included in at least one of the source routed network paths. The controller analyzes the flow information and the network information with machine learning to generate a prediction of at least one metric of source routing behavior within the network. The controller sends the prediction of the at least one metric to one or more source endpoints to optimize the source routed network paths used by future source routed data flows originating from the one or more source endpoints.

20 Claims, 5 Drawing Sheets

(51) Int. Cl.
  *H04L 12/751* (2013.01)
  *G06N 20/00* (2019.01)

(56) References Cited

U.S. PATENT DOCUMENTS

| | | |
|---|---|---|
| 2015/0195193 A1* | 7/2015 | Narayanan .............. H04L 45/38 |
| | | 709/242 |
| 2015/0304206 A1 | 10/2015 | Filsfils et al. |
| 2016/0105364 A1 | 4/2016 | Kanonakis et al. |
| 2017/0012870 A1 | 1/2017 | Blair et al. |
| 2017/0078170 A1 | 3/2017 | Vasseur et al. |
| 2017/0288948 A1* | 10/2017 | Singh .................. H04L 41/0659 |
| 2017/0324647 A1* | 11/2017 | Anand .................... H04L 45/42 |
| 2018/0060744 A1* | 3/2018 | Achin .................... G06N 20/00 |

* cited by examiner

OPTIMIZING SOURCE ROUTING USING MACHINE LEARNING

TECHNICAL FIELD

The present disclosure relates to computer networking.

BACKGROUND

In a source routing network environment, forwarding of data flows is defined by a source within the network. A source may be, for example, any network entity or endpoint able to support Segment Routing (e.g., SRv6). The underlying network fabric typically would not have any information regarding the future paths taken by source routed data flows. As such, optimizing the underlying Layer 3 fabric may not be possible without tracking and learning source routing behavior over time.

DESCRIPTION OF EXAMPLE EMBODIMENTS

Overview

Figure 1:
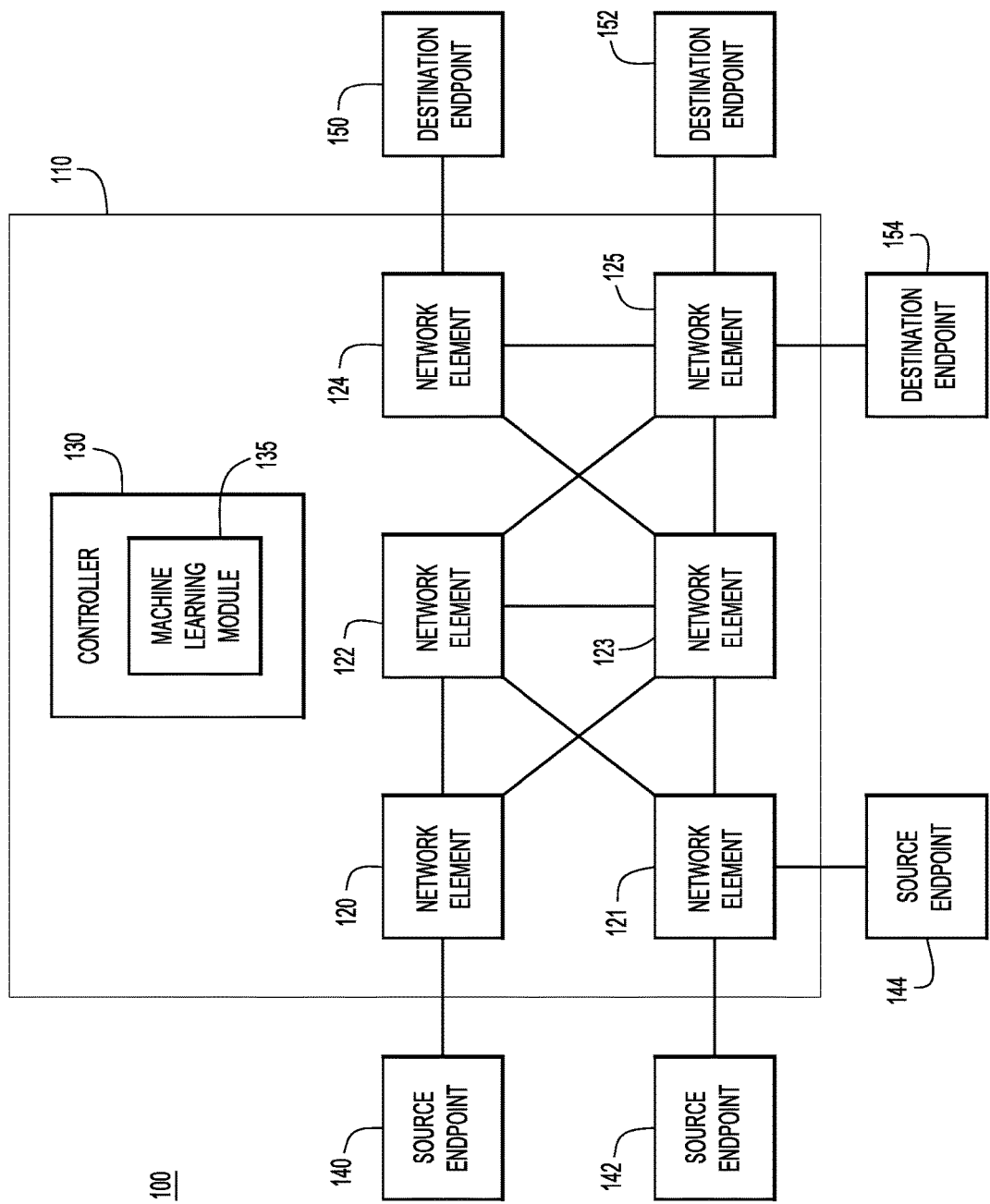
FIG. 1 is a simplified block diagram of a system to optimize source routed network flows, according to an example embodiment.

In one embodiment, a computer-implemented method is provided for a controller device to send predictions from a machine learning module to source endpoints. The method includes receiving from a plurality of network elements in a network, flow information associated with a plurality of source routed data flows that traverse the network in a plurality of source routed network paths. The method also includes receiving from the plurality of network elements, network information associated with network characteristics of each of the plurality of network elements included in at least one of the source routed network paths. The method further includes analyzing the flow information and the network information with machine learning to generate a prediction of at least one metric of source routing behavior within the network. The method then includes sending the prediction of the at least one metric to one or more source endpoints to optimize the source routed network paths used by future source routed data flows originating from the one or more source endpoints.

DETAILED DESCRIPTION

The techniques described herein leverage machine learning algorithms to get an understanding of source routing behavior over time to optimize the underlying Layer 3 network fabric and influence the source routed network path selection. The machine learning algorithms may learn source routing behavior, most desired network paths, or other characteristics of the network fabric. Hereinafter, the source routing environment is described as an Internet Protocol version 6 (IPv6) based Segment Routing (SR) environment, but other source routing protocol (e.g., Multiprotocol Label Switching (MPLS) SR) may also benefit from the techniques described herein.

The machine learning algorithms may provide traffic engineering, environment optimization in the underlying Layer 3 fabric, and optimization recommendations to the sources of the source routed data flows. As described herein, a source may be any entity that is configured to process SR traffic, and which is configured to define a source based network path through a SR network environment. For instance, sources may include endpoints such as virtual machines, containers, virtual network functions, or physical computing devices (e.g., Internet of Things (IoT) devices). The underlying network fabric may be defined by an Interior Gateway Protocol (IGP) and/or Exterior Gateway protocol (EGP), such as Open Shortest Path First (OSPF) or Border Gateway Protocol (BGP). Each SR-enabled network element includes machine learning capabilities, but the machine learning algorithm considers the entire network rather than merely individual network elements.

The techniques presented herein provide SR-enabled network elements with machine learning capabilities and correlate SR-specific details to learn source routing behavior over time. The findings are used to dynamically optimize the underlay network, and may also be provided to the sources of the data flows to optimize their path selection. The machine learning provides dynamic traffic engineering over time based on the output of the machine learning module using an input of historical data that may be updated over time.

This system provides a network capability whereby an optimal SR path is predicted by leveraging a variety of network input data sources and presenting them to a machine learning module that determines labeled probabilities for the optimal SR path. This provides actionable intelligence to SR-enabled network elements that improves efficiency, performance, and user experience for a network. This network improvement is extended further when the dynamic traffic engineering capability can also be visualized (e.g., centrally by an application at a controller level) and can provide important network management and policy enforcement applications as an overlay to the underlying network infrastructure.

The predictability of SR paths may be seen in the context of other relevant network traffic characteristics, such as time of day, type of application, packet details, and/or source deployment type. The information gathered using machine learning algorithms over time allows visibility into optimal path selection in specific contexts.

Referring now to FIG. 1, a network system 100 is provided for optimizing a network infrastructure 110 for source routed data flows based on a machine learning algorithm. The network infrastructure includes network elements 120, 121, 122, 123, 124, and 125 and a controller 130. The controller 130 includes a machine learning module 135 that gathers inputs from the network elements 120-126 and provides analysis and predictions of source routed data flows in the network system 100. The network infrastructure 110 carries source routed data flows from source endpoints 140, 142, and 144 to destination endpoints 150, 152, and 154.

In the example depicted in FIG. 1, the network elements 120-125 are arranged in a partially meshed network topology. However, the techniques described herein may be used in other network topologies (e.g., fully meshed, spine-leaf, ring, etc.). Additionally, the network topology of the network infrastructure 110 may be changed (e.g., by the controller 130) to adapt to output from the machine learning module 135.

In one example, the source endpoints 140, 142, and 144 may also function as destination endpoints. Similarly, the destination endpoints 150, 152, and 154 may function as source endpoints. The source/destination endpoints may be physical and/or virtual computing devices.

In another example, the machine learning module 135 gathers input data including source routed network path details from a source endpoint's point of view, source routed network path details from each network element's point of view, network characteristics (e.g., network element resources, path characteristics, speed, etc.), or other relevant data that supports learning over time. The machine learning module 135 is optimized to provide output data over time that includes source routing behavior (e.g., SR nodes used most often in SR paths, SR nodes used least in SR paths, longest SR paths, shortest SR paths, source selection of SR paths, etc.) a correlation of environmental details (e.g., network resources) and path details (e.g., frequently used SR nodes), specific traffic sent across certain network paths (e.g., are certain types of network traffic sent more frequently over certain paths in comparison to network traffic of a different type), and/or environmental details that may influence the definition of source routed network paths.

In a further example, the source endpoints may select any path through the SR-enabled network infrastructure 110, and may not have any information regarding the over-utilization of other potential issues (e.g., latency, resource availability/ usage, bandwidth capacity, noisy neighbors, etc.) with the individual network elements. The network infrastructure 110 is based on a set of network elements 120-125 that are feeding back details about their view of the network environment. This may include information on the number of SR-based flows, SR-based flow characteristics, resource availability/usage, and/or source routed network path characteristics. Each of the network elements 120-125 may send this information to the centralized, machine-learning-enabled controller 130. The information may be transmitted form the network elements to the controller in any suitable format (e.g., Inband Operations, Administration, and Management (iOAM) messages).

The controller 130 of the network provides the machine learning module 135, collects information from all of the network elements 120-125, and computes predictions of optimized paths through the network. These predictions may be provided to source endpoints to optimize their source routing through the network environment.

Figure 2:
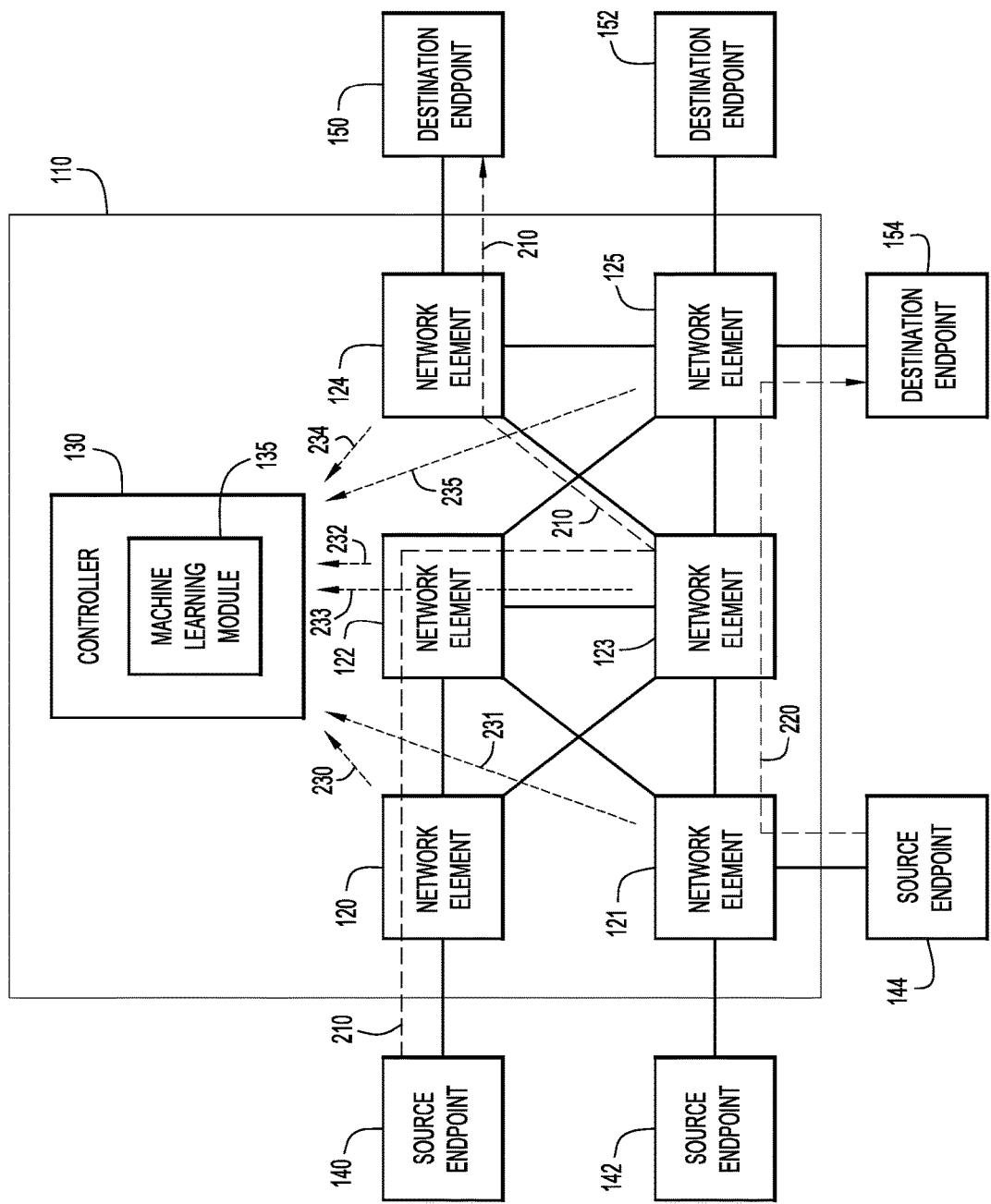
FIG. 2 is a simplified block diagram illustrating a network controller collecting input data from source routing enabled network elements for a machine learning module, according to an example embodiment.

Referring now to FIG. 2, a simplified block diagram illustrates the machine learning module 135 on the controller 130 gather input data on source routed data flows. Source endpoint 140 sends a source routed data flow to the destination endpoint 150. The source endpoint 140 defines the source routed network path 210 through the network infrastructure 110 that the data flow will follow. In this example, the source routed network path 210 starts at network element 120, continues to network element 122, network element 123, and network element 124 before reaching the destination endpoint 150. Similarly, source endpoint 144 sends a source routed data flow to the destination endpoint 154. The source endpoint 144 defines the source routed network path 220 through the network infrastructure that the data flow will follow. In this example, the source routed network path 220 starts at network element 121, continues to network element 123, and network element 125 before reaching the destination endpoint 154.

Each of the network elements 120-125 send input data for the machine learning module 135 to the controller 130. Network elements 120, 121, 122, 123, 124, and 125 send input data 230, 231, 232, 233, 234, and 235, respectively. In one example the input data (e.g., input data 230) may include flow information associated with the source routed data flows that follow certain network paths (e.g., source routed network path 210) as well as network information associated with the individual network element (e.g., network element 120).

In one example, the source routed data flows may carry cloud identifier information (e.g., service provider identifiers and tenant identifiers) as an extension of the segment routing environment. For instance, the segment routing for IPv6 (SRv6) may be extended by a customized Type-Length-Value (TLV) field that carries these identifiers for each flow sent through the segment routing environment. On each of the network elements, the cloud identifiers may be correlated with the machine learning input data to provide further details on the network paths. For instance, the source 144 and the destination 154 may represent cloud services that exchange tenant-specific traffic along network path 220. By providing the cloud identifiers to the network elements 121, 123, and 125, these network elements may provide the cloud identifiers as part of the input data 231, 233, 235. Incorporating and correlating SR-path and SR-flow characteristics to specific tenants enables the machine learning module 135 to generate predictions on a per-tenant basis. The controller 130 may recommend source-specific paths, based on the learning over time, for a set of tenants. Alternatively, the controller may suggest that sources for a specific tenant avoid certain network paths that competing tenants are using. Being able to learn SR-paths for specific Provider/ Service/Tenant tuples enriches predictions for cloud environments.

Figure 3:
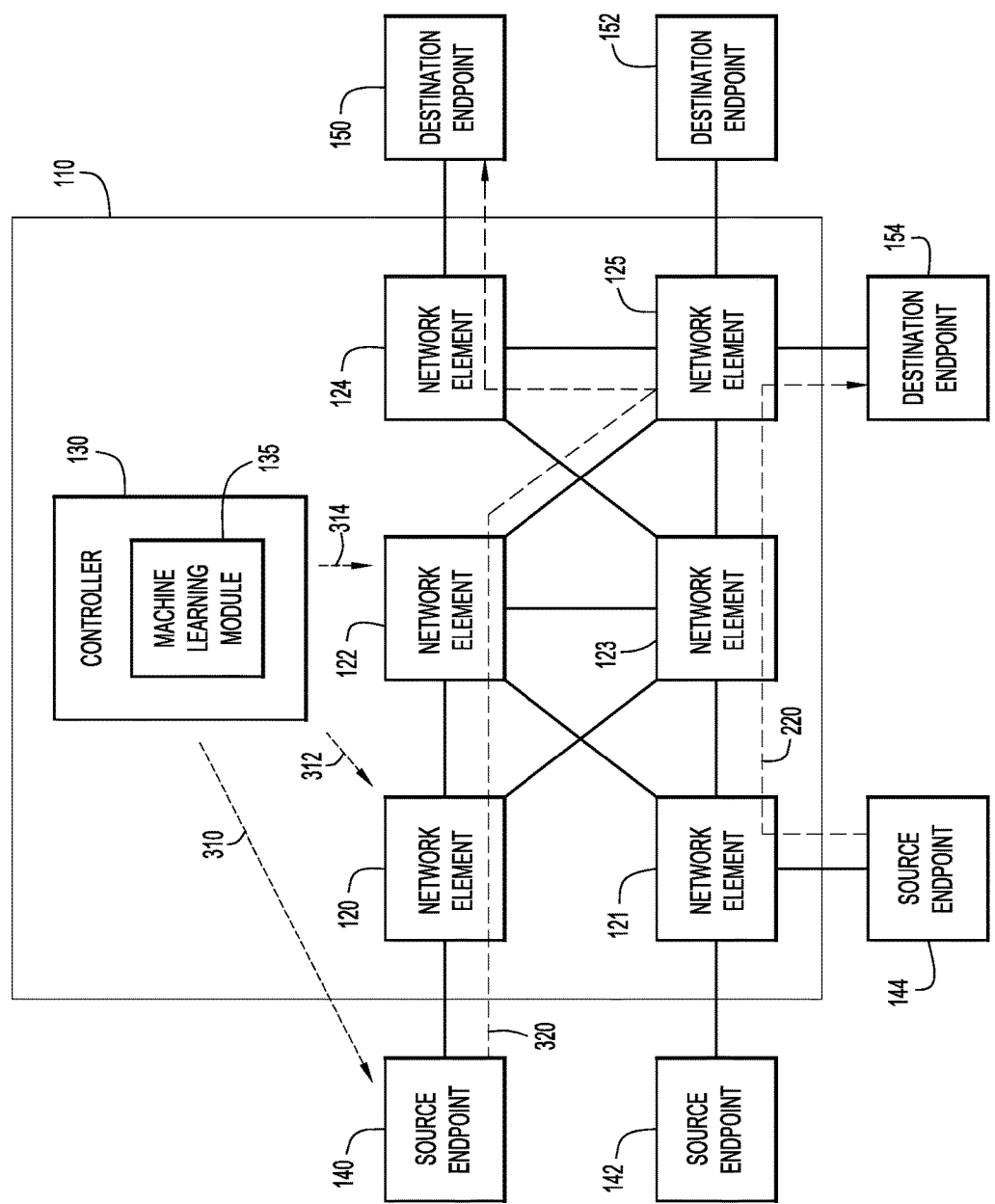
FIG. 3 is a simplified block diagram illustrating a network controller providing predictions of source routed flow behavior in a network, according to an example embodiment.

Referring now to FIG. 3, a simplified block diagram illustrates the controller 130 providing feedback based on the output of the machine learning module 135. The controller sends feedback 310 to the source endpoint 310. The controller 130 also sends feedback 312 and 314 to the network elements 120 and 122, respectively. The feedback 310 causes the source endpoint 140 to change the network path for data flows to destination endpoint 150. The source endpoint 140 defines another source routed network path 320 that includes network element 120, followed by network element 122, network element 125, and network element 124.

In one example, the machine learning module 135 may determine that the network element 123 is likely to be overloaded by handling traffic from both network paths 210 and 220, as described with respect to FIG. 2. The machine learning module 135 may determine that the network element 125 will be a better candidate to handle the data flow from source endpoint 140 to destination endpoint 150, and provide that information to the source endpoint 140 in the feedback 310. For instance, the network element 125 may have more resources (bandwidth, speed, etc.) to handle the specific type of data flow that source endpoint 140 is sending to destination endpoint 150. Additionally, the link between network element 122 and network element 123 may be more prone to errors than the link between network element 122 and network element 125. In another instance, the network element 123 may have fewer resources to handle bursts of traffic between source endpoint 144 and destination endpoint 154 (i.e., along network path 220) if the data flow between source endpoint 140 and destination endpoint 150 remains routed through the network element 123. The machine learning module 135 is configured to receive information from across the network infrastructure 110 and determine optimal source routed network paths. In this way, the machine learning module 135 may be used to provide feedback to the source endpoints to optimize their selection of network paths.

Additionally, feedback (e.g., feedback 312, 314) that is sent to the network elements (e.g., network elements 120, 122) may reconfigure the network elements to optimize how the underlay network handles the source routed data flows. For instance, based on the received feedback, a network element may prioritize specific types of data flows (e.g., Voice over IP, Transport Control Protocol (TCP), User Datagram Protocol (UDP), etc.), specific endpoints (e.g., source endpoint 142 over source endpoint 144), or specific tenants that use the network infrastructure 110. In this way, the output of the machine learning module 135 may be used to optimize the underlying Layer 3 fabric environment (e.g., hardware, software, configuration, etc.).

Further, any or all of the feedback (e.g., feedback 310, 312, 314) generated by the machine learning module 135 may be used as a recursive input back into the machine learning module 135. For instance, the feedback 310 may be a recommendation for the source endpoint 140 to modify one or more source routed network path. The feedback 310 may be provided back to the machine learning module 135 along with information on whether the recommendation was used by the source endpoint 140. Similarly, feedback 312/314 may be used as a recursive input to the machine learning module 135 along with information on whether the network element 120/122 modified any behavior in response to the feedback 312/314. Based on the recursive input of the feedback, the machine learning module 135 may continually update the feedback, as the network 110 is dynamically changing over time based on previous feedback.

Figure 4:
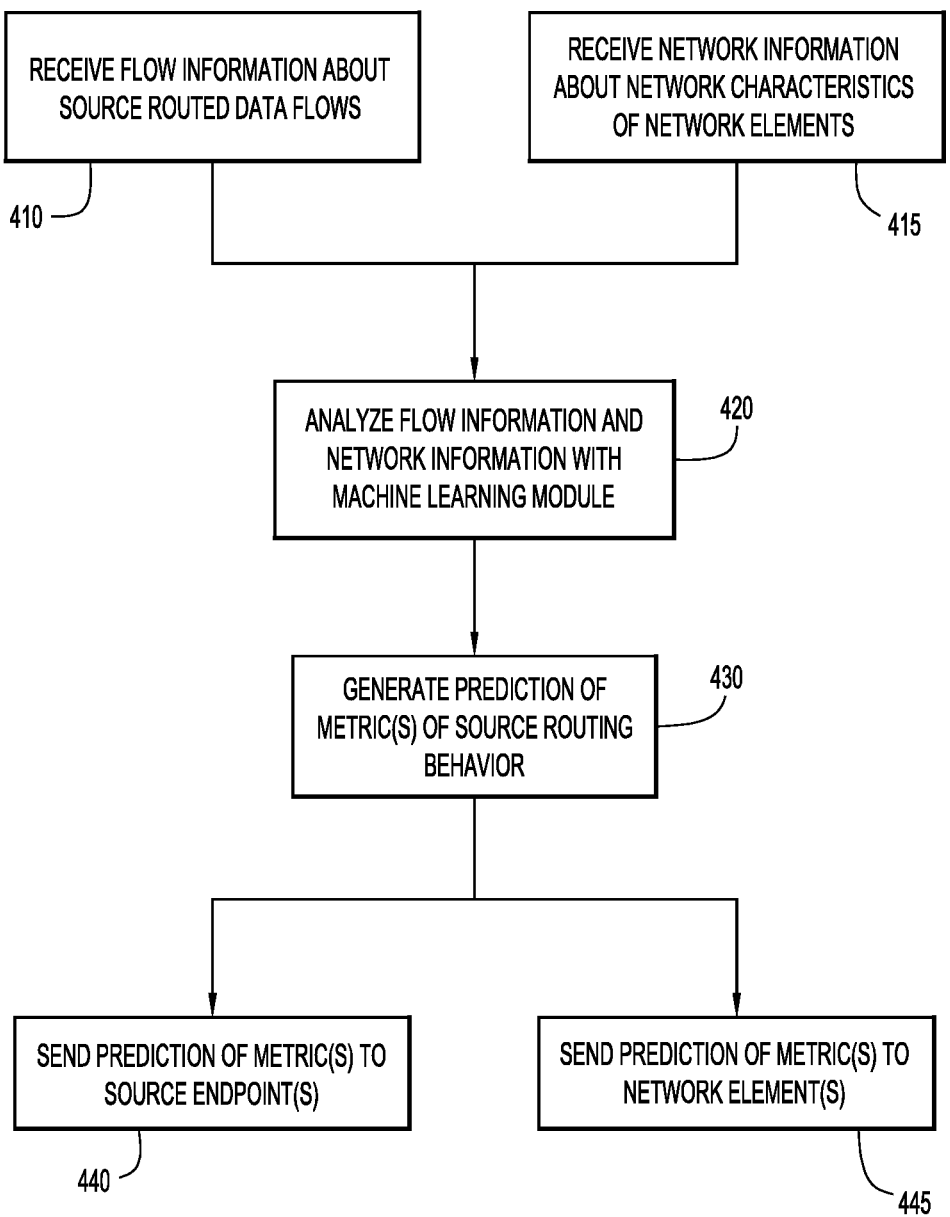
FIG. 4 is a flow chart illustrating the operations performed by a network controller in optimizing source routed network paths with a machine learning module, according to an example embodiment.

Referring now to FIG. 4, a flow chart is shown that illustrates operations performed by a controller device (e.g., controller 130) in a process 400 for optimizing source based network paths based on machine learning. In step 410, the controller receives flow information associated with source routed data flows that traverse a network in source routed network paths. In one example, the flow information includes a source network address, a destination network address, a network protocol, a total number of source routed data flows, an identifier associated with a tenant of the network, and/or an indication of network characteristics associated with each source routed network path. In step 415, the controller receives network information associated with network elements that carry source routed data flows in the source routed network paths. In one example, the network information includes an indication of utilization at each of the network elements, an indication of available bandwidth at each network element, and/or an indication of network topology.

In step 420, the controller analyzes the flow information and the network information with a machine learning module. In one example, each aspect of the flow information and the network information is used as an input to a machine learning algorithm. In step 430, the controller generates a prediction of at least one metric of the behavior of the source routed data flows in the source routed network environment. In one example, the metric may include an indication of network elements most frequently included in the source routed network paths, an indication of network elements least frequently included in the source routed network paths, an indication of the longest source routed network path, an indication of the shortest source routed network path, a correlation between network element resources and the source routed network paths, and/or a correlation between a type of source routed network flow and the source routed network paths.

In step 440, the controller sends a prediction of the metric to one or more source endpoints to enable the source endpoints to optimize their selection of source routed network paths. In one example, the controller may determine specific alternate network paths for specific data flows and send the prediction to the source of that specific data flow. This may cause the source of that specific data flow to use the alternate network path for that specific data flow in the future. Alternatively, the controller may send a prediction of network conditions, enabling the source endpoint(s) to determine any alternate network paths for future transmission of data flows.

In another example, the controller may send the prediction of the metric to a separate mechanism that defines the source routing information. In other words, the source endpoint(s) may receive source routing information from a central management node/controller, which receives the prediction of the metric to refine the source routing information that is sent to the source endpoints.

In step 445, the controller sends a prediction of the metric to one or more of the network elements in the network infrastructure to optimize the underlay network for the source routed data flows. In one example, the prediction of the metric may include instructions to reconfigure one or more network elements under specific conditions (e.g., at a specific time, or upon receipt of a specific type of data flow, etc.).

In one example, the process 400 provides for optimization through two use-case scenarios: 1) optimization at the source, and 2) optimization in the network infrastructure. These dynamic optimizations based on the predictions may be dependent on each other. In other words, predicting and recommending optimized paths to a source will likely change the way traffic flows through the network. As such, the predictions provided to the network elements may take the newly recommended network paths into account, so as not to counter the predictions provided to the sources.

To provide optimization at the source endpoints, the machine learning module predicts optimal paths through the network infrastructure (e.g., a Segment Routing environment). This information is fed back to one or more of the sources and correlated with relevant environmental information. For instance, when a source sends Hypertext Transfer Protocol (HTTP) traffic to a destination, the source may construct a SR header defining which hops the packets should take on the way to the destination (i.e., the network path). The machine learning may influence this construction of a source-defined network path through the prediction data of the optimal path. The prediction data may be provided with various contexts (e.g., time of day, traffic type, etc.). The source may use the contextual data to dynamically adjust the path selection. In other words, the optimized path during peak hours (e.g., high traffic volume in the network, high percentage of source-based routing, etc.) may differ from the optimized path during off-peak hours. Additionally, to provide further granularity, the path selection process may account for different HTTP operations (e.g., GET, POST, etc.) in selecting the optimal network path. This level of granularity may also be applied to various traffic types and applications.

To provide optimization in the network, the predictions generated by the machine learning module in the controller may be fed back to the network elements in the network infrastructure. These predictions may be provided with the same contextual information as described with respect to the source-based optimization. For instance, historical data may enable the machine learning module to predict that a specific network element in the network infrastructure will be at its critical resource limit during peak hours. By correlating this prediction, contextual information on the time of the peak hours, and the prediction information provided to the sources, the controller may provide recommendations to the underlying network infrastructure to dynamically update the optimized paths and avoid running into resource constraints at heavily used nodes.

Figure 5:
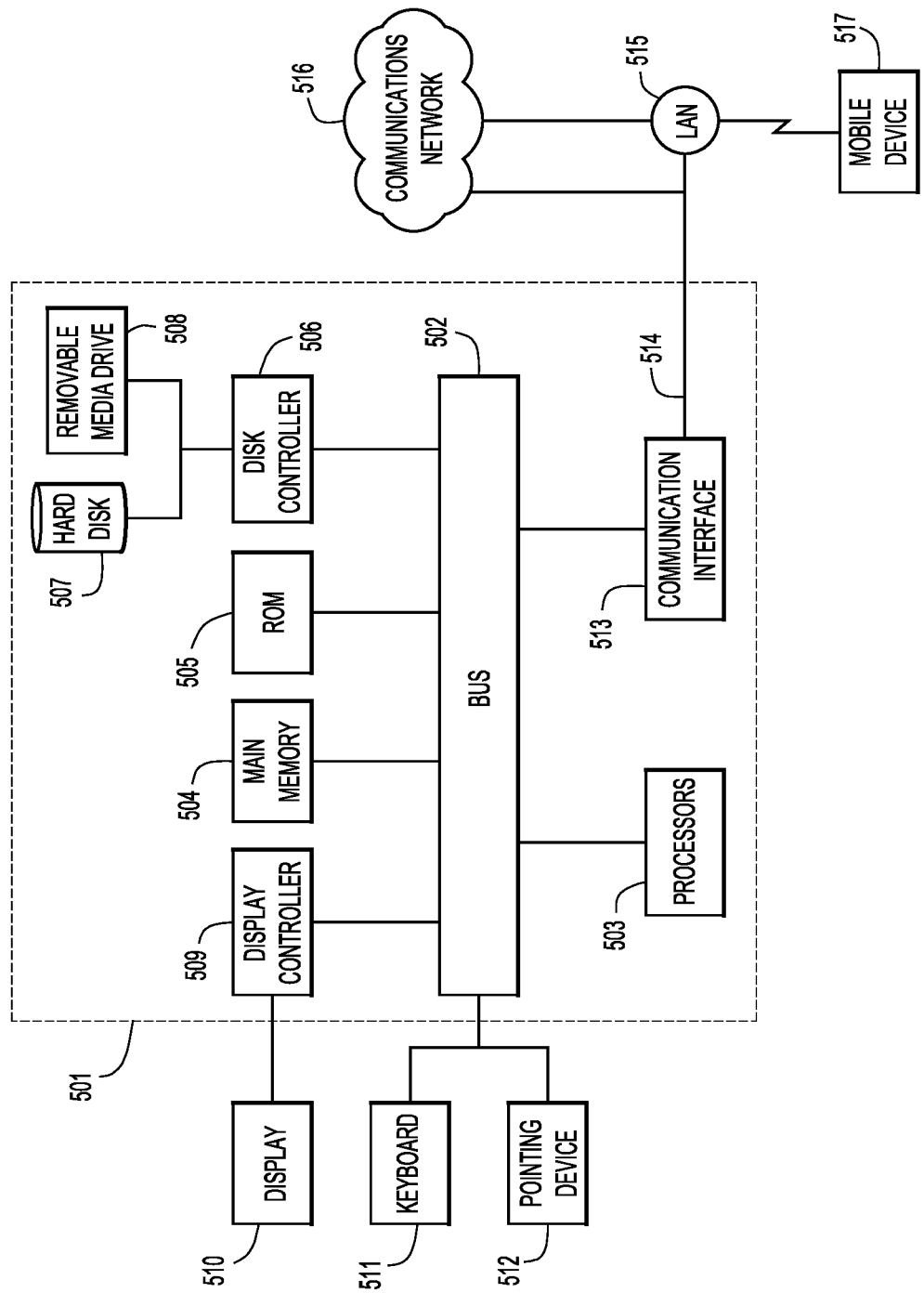
FIG. 5 is a simplified block diagram of a device that may be configured to perform methods presented herein, according to an example embodiment.

Referring now to FIG. 5, an example of a block diagram of a computer system 501 that may be representative of the controller 130 in which the embodiments presented may be implemented is shown. The computer system 501 may be programmed to implement a computer based device, such as a controller for a software defined network. The computer system 501 includes a bus 502 or other communication mechanism for communicating information, and a processor 503 coupled with the bus 502 for processing the information. While the figure shows a single block 503 for a processor, it should be understood that the processors 503 may represent a plurality of processing cores, each of which can perform separate processing. The computer system 501 also includes a main memory 504, such as a random access memory (RAM) or other dynamic storage device (e.g., dynamic RAM (DRAM), static RAM (SRAM), and synchronous DRAM (SD RAM)), coupled to the bus 502 for storing information and instructions to be executed by processor 503. In addition, the main memory 504 may be used for storing temporary variables or other intermediate information during the execution of instructions by the processor 503.

The computer system 501 further includes a read only memory (ROM) 505 or other static storage device (e.g., programmable ROM (PROM), erasable PROM (EPROM), and electrically erasable PROM (EEPROM)) coupled to the bus 502 for storing static information and instructions for the processor 703.

The computer system 501 also includes a disk controller 506 coupled to the bus 502 to control one or more storage devices for storing information and instructions, such as a magnetic hard disk 507, and a removable media drive 508 (e.g., floppy disk drive, read-only compact disc drive, read/write compact disc drive, compact disc jukebox, tape drive, and removable magneto-optical drive, solid state drive, etc.). The storage devices may be added to the computer system 501 using an appropriate device interface (e.g., small computer system interface (SCSI), integrated device electronics (IDE), enhanced-IDE (E-IDE), direct memory access (DMA), ultra-DMA, or universal serial bus (USB)).

The computer system 501 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, include types of processing circuitry. The processing circuitry may be located in one device or distributed across multiple devices.

The computer system 501 may also include a display controller 509 coupled to the bus 502 to control a display 510, such as a cathode ray tube (CRT), liquid crystal display (LCD) or light emitting diode (LED) display, for displaying information to a computer user. The computer system 501 includes input devices, such as a keyboard 511 and a pointing device 512, for interacting with a computer user and providing information to the processor 503. The pointing device 512, for example, may be a mouse, a trackball, track pad, touch screen, or a pointing stick for communicating direction information and command selections to the processor 503 and for controlling cursor movement on the display 510. In addition, a printer may provide printed listings of data stored and/or generated by the computer system 501.

The computer system 501 performs a portion or all of the processing steps of the operations presented herein in response to the processor 503 executing one or more sequences of one or more instructions contained in a memory, such as the main memory 504. Such instructions may be read into the main memory 504 from another computer readable storage medium, such as a hard disk 507 or a removable media drive 508. One or more processors in a multi-processing arrangement may also be employed to execute the sequences of instructions contained in main memory 504. In alternative embodiments, hard-wired circuitry may be used in place of or in combination with software instructions. Thus, embodiments are not limited to any specific combination of hardware circuitry and software.

As stated above, the computer system 501 includes at least one computer readable storage medium or memory for holding instructions programmed according to the embodiments presented, for containing data structures, tables, records, or other data described herein. Examples of computer readable storage media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM, DVD), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 501, for driving a device or devices for implementing the operations presented herein, and for enabling the computer system 501 to interact with a human user (e.g., a network administrator). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 501 also includes a communication interface 513 coupled to the bus 502. The communication interface 513 provides a two-way data communication coupling to a network link 514 that is connected to, for example, a local area network (LAN) 515, or to another communications network 516 such as the Internet. For example, the communication interface 513 may be a wired or wireless network interface card to attach to any packet switched (wired or wireless) LAN. As another example, the communication interface 513 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 513 sends and receives electrical, electromagnetic or optical signals that carry digital data streams representing various types of information.

The network link 514 typically provides data communication through one or more networks to other data devices. For example, the network link 514 may provide a connection to another computer through a local area network 515 (e.g., a LAN) or through equipment operated by a service provider, which provides communication services through a communications network 516. The local network 514 and the communications network 516 use, for example, electrical, electromagnetic, or optical signals that carry digital data streams, and the associated physical layer (e.g., CAT 5 cable, coaxial cable, optical fiber, etc.). The signals through the various networks and the signals on the network link 514 and through the communication interface 513, which carry the digital data to and from the computer system 501 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 501 can transmit and receive data, including program code, through the network(s) 515 and 516, the network link 514 and the communication interface 513. Moreover, the network link 514 may provide a connection through a LAN 515 to a mobile device 517 such as a personal digital assistant (PDA), tablet computer, laptop computer, or cellular telephone.

In summary, the techniques presented herein use machine learning algorithms to learn source routing behavior, most desired network paths, and other characteristics, over time. Predictions of the source routing behavior are able to influence the way a source in a source routed network environment defines a network path to a destination. This enables dynamic traffic engineering based on predictions gathered through studying historical data. These techniques provide an improved understanding of behavior in a source routing environment, including least/most used network links and/or network elements. Additionally, the findings/learnings of the machine learning module may be used to optimize both the underlay and the source routed path definition.

In one form, a method is provided for a controller device to send predictions from a machine learning module to source endpoints. The method includes receiving from a plurality of network elements in a network, flow information associated with a plurality of source routed data flows that traverse the network in a plurality of source routed network paths. The method also includes receiving from the plurality of network elements, network information associated with network characteristics of each of the plurality of network elements included in at least one of the source routed network paths. The method further includes analyzing the flow information and the network information with machine learning to generate a prediction of at least one metric of source routing behavior within the network. The method then includes sending the prediction of the at least one metric to one or more source endpoints to optimize the source routed network paths used by future source routed data flows originating from the one or more source endpoints.

In another form, an apparatus is provided comprising a network interface unit and a processor. The network interface unit is configured to receive from a plurality of network elements in a network, flow information associated with a plurality of source routed data flows that traverse the network in a respective plurality of source routed network paths. The network interface unit also is configured to receive from the plurality of network elements, network information associated with network characteristics of each of the plurality of network elements included in at least one of the source routed network paths. The processor is configured to analyze the flow information and the network information with a machine learning module to generate a prediction of at least one metric of source routing behavior within the network. The processor is also configured to cause the network interface unit to send the prediction of the at least one metric to one or more source endpoints to optimize the source routed network paths used by future source routed data flows originating from the one or more source endpoints.

In a further form, a non-transitory computer readable storage media is provided that is encoded with instructions that, when executed by a processor in a controller device, cause the processor to receive from a plurality of network elements in a network, flow information associated with a plurality of source routed data flows that traverse the network in a plurality of source routed network paths. The instructions also cause the processor to receive from the plurality of network elements, network information associated with network characteristics of each of the plurality of network elements included in at least one of the source routed network paths. The instructions further cause the processor to analyze the flow information and the network information with machine learning to generate a prediction of at least one metric of source routing behavior within the network. The instructions also cause the processor to send the prediction of the at least one metric to one or more source endpoints to optimize the source routed network paths used by future source routed data flows originating from the one or more source endpoints.

In still another form, a network system is provided comprising a plurality of network elements and a controller device. Each of the plurality of network elements is configured to export flow information associated with a plurality of source routed data flows that traverse the network system in a respective plurality of source routed network paths. Each of the network elements is also configured to export network information associated with network characteristics of each of the plurality of network elements included in at least one of the source routed network paths. The controller device is configured to receive the flow information and the network information from the plurality of network elements. The controller is also configured to analyze the flow information and the network information with a machine learning module to generate a prediction of at least one metric of source routing behavior within the network system. The controller is further configured to send the prediction of the at least one metric to one or more source endpoints to optimize the source routed network paths used by future source routed data flows originating from the one or more source endpoints.

The above description is intended by way of example only. The present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Although the techniques are illustrated and described herein as embodied in one or more specific examples, it is nevertheless not intended to be limited to the details shown, since various modifications and structural changes may be made within the scope and range of equivalents of this disclosure.

What is claimed is:

1. A method comprising:
   receiving from a plurality of network elements in a network, flow information associated with a plurality of source routed data flows that traverse the network in a respective plurality of source routed network paths;
   receiving from the plurality of network elements, network information associated with network characteristics of each of the plurality of network elements included in at least one of the source routed network paths;
   analyzing the flow information and the network information with a machine learning module to generate a prediction of at least one metric of source routing behavior within the network;
   sending the prediction of the at least one metric to one or more source endpoints to optimize the source routed network paths used by future source routed data flows originating from the one or more source endpoints;
   providing the prediction of the at least one metric as a recursive input to the machine learning module;
   receiving from the one or more source endpoints, updated flow information indicating whether the prediction of the at least one metric altered at least one source routed network path used by the future source routed data flows originating from the one or more source endpoints;
   analyzing the updated flow information, the network information, and the recursive input to the machine learning module to generate an updated prediction of the at least one metric; and
   sending the updated prediction of the at least one metric to the one or more source endpoints.

2. The method of claim 1, further comprising sending the prediction of the at least one metric to at least one of the plurality of network elements enabling the network elements to optimize underlying network infrastructure based on the prediction.

3. The method of claim 1, wherein the flow information comprises a source network address, a destination network address, a network protocol used in the plurality of source routed data flows, a total number of the plurality of source routed data flows, an identifier associated with a tenant of the network, or an indication of network characteristics associated with each of the plurality of source routed network paths.

4. The method of claim 1, wherein the network information comprises an indication of utilization at each of the plurality of network elements, an indication of available bandwidth at each network element, or an indication of network topology.

5. The method of claim 1, wherein the at least one metric of source routing behavior within the network comprises an indication of network elements most frequently included in the source routed network paths, an indication of network elements least frequently included in the source routed network paths, an indication of the longest source routed network path, an indication of the shortest source routed network path, a correlation between network element resources and the source routed network paths, or a correlation between a type of source routed network flow and the source routed network paths.

6. The method of claim 1, wherein the plurality of network elements support segment routing as a source routing protocol.

7. An apparatus comprising:
   a network interface configured to:
      receive from a plurality of network elements in a network, flow information associated with a plurality of source routed data flows that traverse the network in a respective plurality of source routed network paths; and
      receive from the plurality of network elements, network information associated with network characteristics of each of the plurality of network elements included in at least one of the source routed network paths; and
   a processor configured to:
      analyze the flow information and the network information with a machine learning module to generate a prediction of at least one metric of source routing behavior within the network;
      cause the network interface to send the prediction of the at least one metric to one or more source endpoints to optimize the source routed network paths used by future source routed data flows originating from the one or more source endpoints;
      provide the prediction of the at least one metric as a recursive input to the machine learning module;
      receive from the one or more source endpoints via the network interface, updated flow information indicating whether the prediction of the at least one metric altered at least one source routed network path used by the future source routed data flows originating from the one or more source endpoints;
      analyze the updated flow information, the network information, and the recursive input to the machine learning module to generate an updated prediction of the at least one metric; and
      cause the network interface to send the updated prediction of the at least one metric to the one or more source endpoints.

8. The apparatus of claim 7, wherein the processor is further configured to cause the network interface to send the prediction of the at least one metric to at least one of the plurality of network elements enabling the network elements to optimize underlying network infrastructure based on the prediction.

9. The apparatus of claim 7, wherein the flow information comprises a source network address, a destination network address, a network protocol used in the plurality of source routed data flows, a total number of the plurality of source routed data flows, an identifier associated with a tenant of the network, or an indication of network characteristics associated with each of the plurality of source routed network paths.

10. The apparatus of claim 7, wherein the network information comprises an indication of utilization at each of the plurality of network elements, an indication of available bandwidth at each network element, or an indication of network topology.

11. The apparatus of claim 7, wherein the at least one metric of source routing behavior within the network comprises an indication of network elements most frequently included in the source routed network paths, an indication of network elements least frequently included in the source routed network paths, an indication of the longest source routed network path, an indication of the shortest source routed network path, a correlation between network element resources and the source routed network paths, or a correlation between a type of source routed network flow and the source routed network paths.

12. The apparatus of claim 7, wherein the plurality of network elements support segment routing as a source routing protocol.

13. A system comprising:
    a plurality of network elements in a network, each of the plurality of network elements configured to:
        export flow information associated with a plurality of source routed data flows that traverse the network in a respective plurality of source routed network paths; and
        export network information associated with network characteristics of each of the plurality of network elements included in at least one of the source routed network paths; and
    a controller device of the network, the controller device configured to:
        receive the flow information and the network information from the plurality of network elements;
        analyze the flow information and the network information with a machine learning module to generate a prediction of at least one metric of source routing behavior within the network; and
        send the prediction of the at least one metric to one or more source endpoints to optimize the source routed network paths used by future source routed data flows originating from the one or more source endpoints;
        provide the prediction of the at least one metric as a recursive input to the machine learning module;
        receive from the one or more source endpoints, updated flow information indicating whether the prediction of the at least one metric altered at least one source routed network path used by the future source routed data flows originating from the one or more source endpoints;
        analyze the updated flow information, the network information, and the recursive input to the machine learning module to generate an updated prediction of the at least one metric; and
        send the updated prediction of the at least one metric to the one or more source endpoints.

14. The system of claim 13, wherein the controller device is further configured to send the prediction of the at least one metric to at least one of the plurality of network elements enabling the network elements to optimize underlying network infrastructure based on the prediction.

15. The system of claim 14, wherein the at least one of the plurality of network elements is configured to optimize an underlay network infrastructure based on the prediction of the at least one metric.

16. The system of claim 15, wherein the underlay network infrastructure is defined by a gateway protocol.

17. The system of claim 13, wherein the flow information comprises a source network address, a destination network address, a network protocol used in the plurality of source routed data flows, a total number of the plurality of source routed data flows, an identifier associated with a tenant of the network, or an indication of network characteristics associated with each of the plurality of source routed network paths.

18. The system of claim 13, wherein the network information comprises an indication of utilization at each of the plurality of network elements, an indication of available bandwidth at each network element, or an indication of network topology.

19. The system of claim 13, wherein the at least one metric of source routing behavior within the network comprises an indication of network elements most frequently included in the source routed network paths, an indication of network elements least frequently included in the source routed network paths, an indication of the longest source routed network path, an indication of the shortest source routed network path, a correlation between network element resources and the source routed network paths, or a correlation between a type of source routed network flow and the source routed network paths.

20. The system of claim 13, wherein the plurality of network elements support segment routing as a source routing protocol.

* * * * *